Oct. 19, 1926.
A. BOUSFIELD
1,603,445
SCALE LOOP
Filed Jan. 2, 1926      2 Sheets-Sheet 2
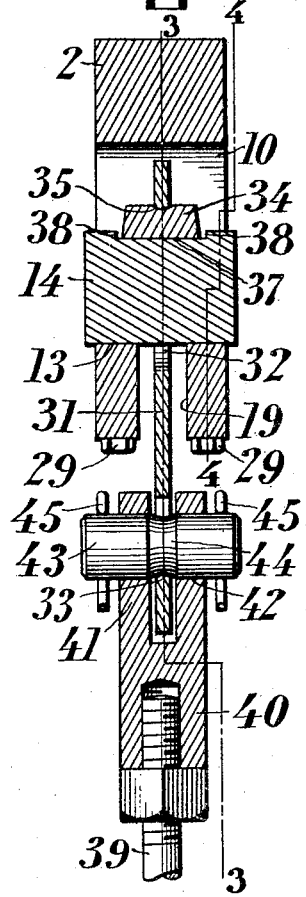
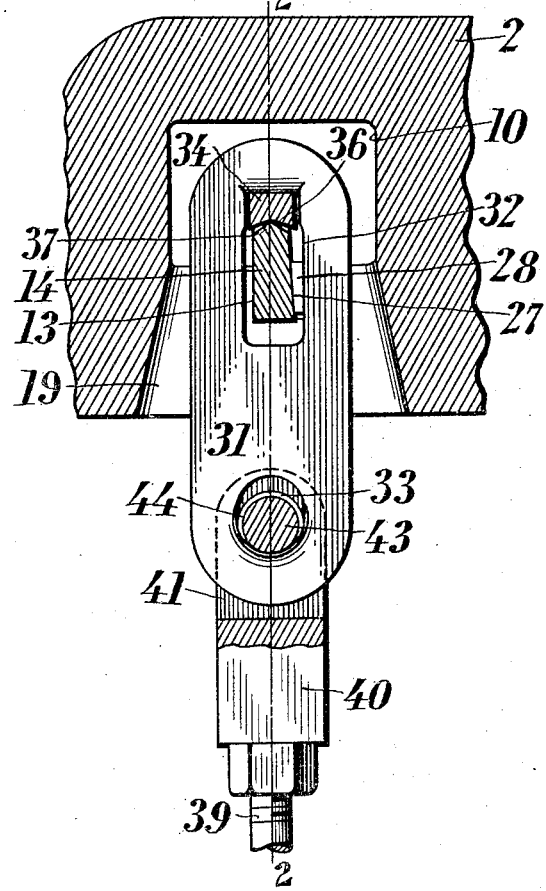
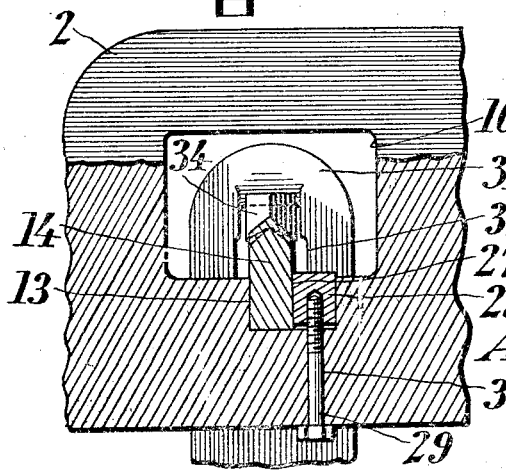
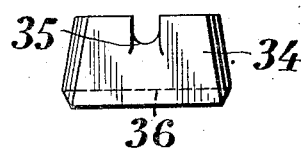
INVENTOR
Alfred Bousfield
BY
M. F. Garnett
ATTORNEY Patented Oct. 19, 1926.

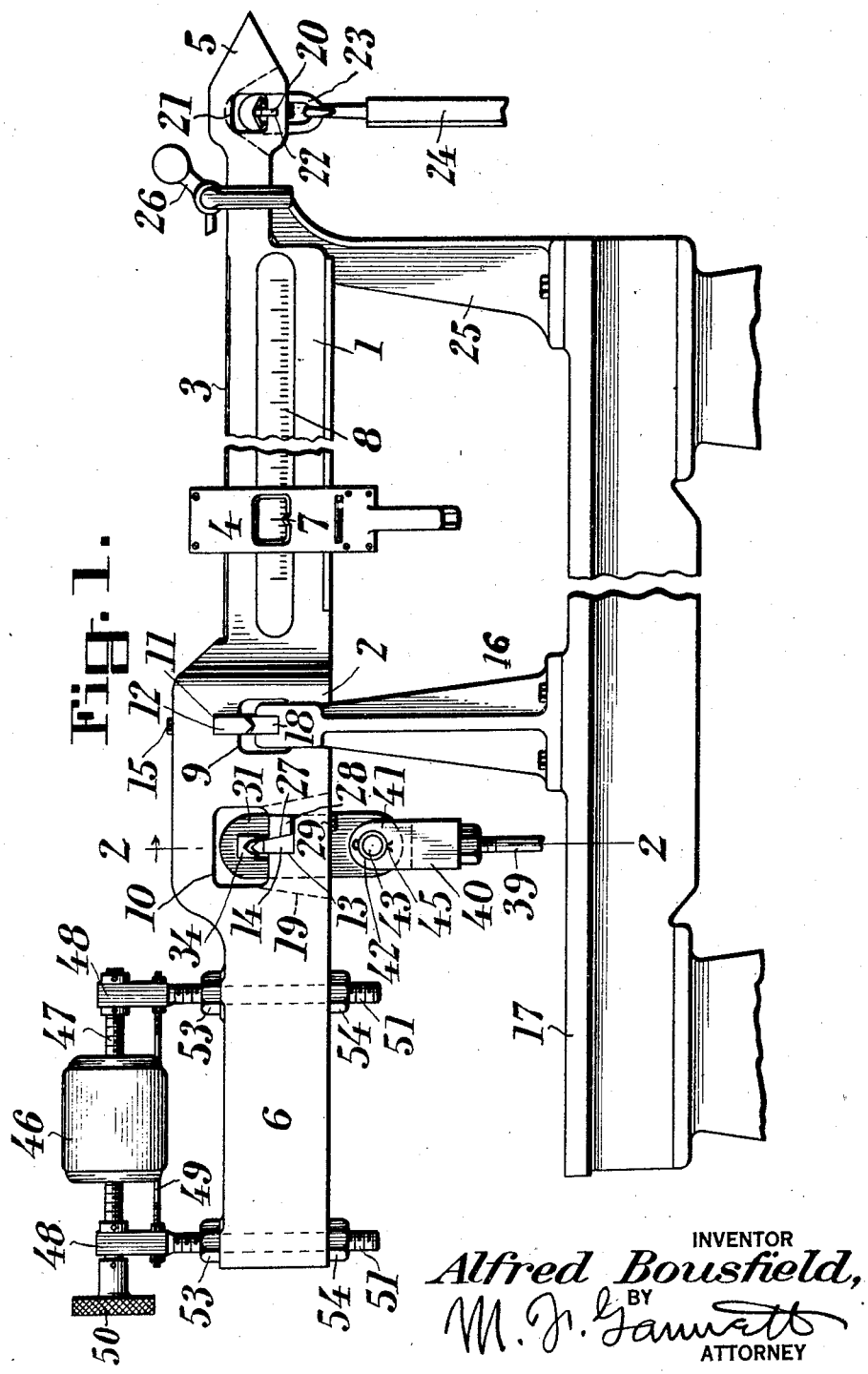

1,603,445

UNITED STATES PATENT OFFICE.

ALFRED BOUSFIELD, OF ST. JOHNSBURY, VERMONT, ASSIGNOR TO E. AND T. FAIR-BANKS AND COMPANY, OF ST. JOHNSBURY, VERMONT, A CORPORATION OF VERMONT.

SCALE LOOP.

Application filed January 2, 1926. Serial No. 78,748.

This invention has reference to a weighing scale and aims to provide a device of this character presenting certain improvements over articles of a similar nature as heretofore constructed.

The invention has for its general object improvements in the means employed to connect the load transmitting rod of a weighing scale to the weigh-beam, providing a loop which is relatively simple, reliable and exact in function under varying conditions of service.

Another object is to provide an improved beam whereby the load transmitted thereto is delivered to the longitudinal center line thereof, thereby eliminating torsional stresses in the frame.

Other objects will be in part obvious from the following detailed description and in part pointed out hereinafter.

The invention accordingly consists in the features of construction, combinations of elements and arrangement of parts which will be exemplified in the construction hereinafter set forth, and the scope of the application of which will be indicated in the appended claims.

For a complete understanding of the nature of the invention reference should be had to the accompanying drawings wherein—

Figure 1 is a side elevation of a weigh-beam equipped with my invention;

Fig. 2 is a vertical transverse section taken on the line 2—2 of Fig. 1;

Fig. 3 is a vertical section taken on the line 3—3 of Fig. 2, the loop being shown in elevation;

Fig. 4 is a similar view taken approximately on the line 4—4 of Fig. 2, and

Fig. 5 is a detail view of the bearing used with the loop.

Referring now to the drawings, the weigh-beam comprises a relatively long rectangularly shaped bar 1, having a thickened portion 2 near one end, for reinforcing purposes. A track 3, carrying a poise 4, extends forwardly from the portion 2, and the bar 1 terminates in a tip 5. Projecting from the portion 2 opposite to the track portion is a rear end or butt 6. The poise 4, which can be of any approved design, has a pointer 7 for indicating weights marked on the scale graduations 8.

In order that the load stresses from the lever system of the scale (not shown) may be transmitted to the beam, the portion 2 is provided with a pair of spaced rectangularly shaped openings 9 and 10. The opening 9 has a notch 11 cut into its upper edge for the reception of a knife edge pivot 12, while the opening 10 has a notch 13 cut into its lower edge for the reception of a knife edge pivot 14. The pivot 12 is disposed transversely of the beam and the ends of the pivot project from each side thereof. This pivot is adapted to be detachably secured to the beam by means of a screw 15.

For the purpose of supporting the beam, use is made of a stand 16 mounted on a suitable beam-shelf 17, the top of the stand being provided with concaved bearings 18 on which the projecting ends of the pivot 12 seat. In this manner the beam will be fulcrumed to swing in a vertical path.

A vertical slot 19 is formed in the beam beneath the lower edge of the opening 10, the slot being centrally disposed in the beam, in communication with the opening, and enclosed by the sides of the beam. For a purpose to be hereinafter described, the end walls of the slot are inclined away from each other, as shown by Fig. 3. By this construction, the mouth of the slot is considerably wider than the width of the opening 10. On the other hand, by referring to Fig. 2, it will be seen that the opening 10 and the slot 19, together, form a T-shaped recess in the beam, which recess is spanned by the pivot 14.

As is customary in the construction of weigh-beams, the tip 5, is provided with a knife edge pivot 20. However, in the present instance, the tip is formed with a rectangular opening 21, and the pivot 20 is fixed into a notch 22 formed in the lower edge of the opening. Suspended from the pivot 20 is a loop 23 carrying the upper hooked end of a counter-poise supporting rod 24. A trig stand 25 is supported on the beam-shelf 17 and arranged to cooperate with the tip 5 to indicate balanced position of the beam and to limit vertical swing thereof, or to lock the same in immovable position by means of a pivoted trig 26.

The pivot 12 is mounted in the beam with its sharp edge down, while the pivots 14 and 20 are arranged with their sharp edges up, the knife edges of all of the pivots lying in substantially the same horizontal plane.

In the present design the pivot 14 has a length approximately coinciding with the width of the portion 2 of the beam. However, on account of the great stresses to which this pivot is subjected during use, it is made unusually high in comparison to its length, so that it has a very stocky appearance (see Fig. 2.)

In order that the pivot 14 may be quickly attached or removed from its seat in the notch 13, one side of the pivot is tapered, or inclined, as indicated by the numeral 27. A block 28, having a face inclined to correspond with the inclined face of the pivot, is inserted in the notch, being retained in position by a screw 29 passed upwardly through an opening 30 in the side of the beam. By this invention, two blocks are used, one on each side of the slot 19. The blocks function as wedges, and hence will clamp the pivot in position and prevent any rocking thereof, when the screws 29 are turned up tight.

Suspended from the pivot 14 is a loop 31 in the form of a plate having a rectangular opening 32 near its top, and an annular opening 33 near its bottom.

A bearing block 34 having a concaved groove 35 for engaging with the edge of the loop, is inserted in the opening 32. The block, which is substantially rectangular in form, is arranged transversely to the loop so as to overlie the pivot 14. The groove 35 is cut transversely of the block so as to lie along the longitudinal center line of the beam. The portion of the opening 32 in which the grooved portion 35 of the block is mounted is rounded, the radius of curvature being less than the radius of the concaved groove. In this way a line contact is provided between the block and loop and friction at this point will be reduced to a minimum. Furthermore, the sides of the opening 32 adjacent to the block 34, are restricted with respect to the balance portion of the opening, so as to provide a space having a width only slightly greater than the width of the block, whereby excessive lateral movement of the block with the loop will be prevented when the parts are assembled. The lower edge of the block is also concaved, as indicated at 36, for providing a defined seat for the knife edge of the pivot 14.

The block 34 has a length that is less than the length of the pivot 14, and in order to prevent the block from sliding along the knife edge of the pivot, the knife edge, instead of being formed along the upper face of the pivot, is recessed in the pivot body, as indicated by the numeral 37. This recessing of the knife edge enables shoulders 38 to be formed along the top of the pivot adjacent each end thereof, such shoulders serving as stops, against which the ends of the block can abut should the parts shift with respect to each other.

The knife edge 37 of the pivot 14 can be formed with sides having any desired inclination. As shown, the top of the shoulders 38 are also inclined. This construction of the shoulders is not absolutely necessary, and if so desired the top of the shoulders can be flat. However, in manufacturing the pivot it is desirable to provide a gauge for the knife edges. Hence if the tops of the shoulders 38 are formed with inclined surfaces corresponding to the inclination of the sides of the knife edge of the pivot, then a tool can be used which will enable the operator to properly construct the parts. In this manner uniform machining of the parts can be readily accomplished.

The loop 31 is connected to the lever system of the scale through a rod 39. The upper end of the rod is threaded into a yoke 40, the latter being substantially U-shaped, disposed directly beneath the beam, and having spaced legs 41. The legs are provided with alined apertures 42. A trunnion pin 43 is passed through the apertures 42 of the yoke and the opening 33 of the loop. The pin has a concaved groove 44 formed therein for engaging with the edge of the opening 33. The lower portion of the opening 33 is rounded, the radius of curvature being less than the radius of the concaved groove in the pin. In this way a line contact is provided between the pin and the loop and friction at this point will be reduced to a minimum. The line of contact is disposed coincident with the longitudinal center line of the beam. This construction, it will be noticed, also prevents the pin from sliding with respect to the loop. However, cotter pins 45 are mounted in the extremities of the pin to serve as auxiliary means for retaining the parts together. The cotter pins are spaced from the sides of the yoke, so as to maintain a loose connection therebetween, which is desirable.

During the operation of the device there is a tendency for a vibratory movement being imparted to the rod 39. Therefore, the loop should be free to swing on its pivotal connection with the beam without interference. Hence, the desirability of forming the slot 19 in the manner shown will be readily apparent.

The construction described provides in effect a universal joint between the load transmitting rod and the weigh-beam. At the same time the disposition of the pivotal bearing points is such that the load is transmitted substantially linearly at the intersection of the center planes of the loop and the beam. Furthermore, the above described connection between the load transmitting rod and the weigh-beam permits ready adjustment of the parts, and easy replacement when desired. As the loop projects into the beam and is pivoted thereto along its longitudinal axis, load stresses will be transmitted centrally of the beam without causing rocking thereof.

Means for completing the precise balancing of the beam in zero or no load position is provided by a balance ball 46.

For the purpose of enabling the ball to be moved longitudinally, a rod 47 threaded through the ball is rotatably mounted in the upper ends of a pair of standards 48 spaced from each end of the ball. The ball is restrained from rotation by a rod 49 connecting the standards and bearing against the lower edge of the ball. The rod 47 is provided at its outer end with an operating hand wheel 50.

In order that the ball may be vertically shifted with respect to the end of the beam, the standards 48 are formed with threaded shanks 51, which are passed downwardly through the butt 6, nuts 53 being mounted on the shanks to bear against the upper edge of the beam, and nuts 54 being mounted on the shanks to bear against the bottom of the beam.

By this construction the balance ball can be shifted both longitudinally and vertically to adjust the center of gravity of the beam relatively to its supports. The preliminary adjustment is accomplished by raising or lowering the standards 48, carrying the ball, by turning the nuts 53 and 54 either up or down, and the final adjustment being obtained by manipulating the hand wheel 50 to move the ball longitudinally of its support.

It will further be perceived that the construction of the connecting means between the load transmitting rod and the weigh-beam utilized by my present invention is of such a nature as to constitute a considerable improvement over mechanisms as heretofore provided, in that aside from other advantages achieved, the liability of damage occurring to the parts is reduced to a minimum. Also, it will be noted that by means of a loop provided within the scope of the present invention, such for example that illustrated, the simplicity of the construction is materially enhanced. Furthermore, by utilizing a lop formed from a piece of sheet material, the cost of manufacturing is considerably reduced, as the articles can be quickly stamped in large quantities and readily finished.

Thus among others, the objects aforementioned are accomplished and it will be perceived that the mechanism may be rearranged and modified according to the most desirable practice, and that any suitable bearings and pivots may be used in connection with the same in lieu of those herewith shown.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

Having described my invention, what I claim is:—

1. As a new article of manufacture for the purpose described, a load transmitting loop comprising a perforated plate having a convex bearing surface formed therein.

2. As a new article of manufacture for the purpose described, a load transmitting loop comprising a plate having a pair of spaced openings formed therein, one of said openings being rectangular, the other opening being annular, and convex bearing surfaces formed in said openings.

3. As a new article of manufacture for the purpose described, a load transmitting loop comprising a plate having a pair of spaced openings formed therein, one of said openings being rectangular, the other opening being annular, and convex bearing surfaces formed in said openings, said surfaces being disposed in the portion of the openings adjacent each end of the plate.

4. As a new article of manufacture for the purpose described, a load transmitting loop comprising a plate having a rectangular pivot opening formed therein, one edge of said opening having a convex bearing surface.

5. As a new article of manufacture for the purpose described, a load transmitting loop comprising a plate having an annular pivot opening formed therein, a portion of the edge of said opening having a convex bearing surface.

6. As a new article of manufacture for the purpose described, a load transmitting loop comprising a plate having a rectangular opening formed in one end thereof, the upper portion of said opening being restricted with respect to the balance of the opening, and a bearing mounted in the restricted portion of said opening.

7. As a new article of manufacture for the purpose described, a load transmitting loop comprising a plate having a rectangular opening formed in one end thereof, the upper portion of said opening being restricted with respect to the balance of the opening, and a bearing loosely mounted in the restricted portion of said opening.

8. As a new article of manufacture for the purpose described, a load transmitting loop comprising a plate having a rectangular opening formed in one end thereof, the upper portion of said opening being restricted with respect to the balance of the opening, and a bearing mounted in the restricted portion of said opening, said bearing having a groove formed therein for engaging with the edge of the opening.

9. As a new article of manufacture for the purpose described, a load transmitting loop comprising a plate having a rectangular opening formed in one end thereof, the upper portion of said opening being restricted with respect to the balance of the opening, and a bearing mounted in the restricted portion of said opening, said bearing having a groove formed in its upper face for engaging with the edge of said opening.

10. As a new article of manufacture for the purpose described, a loop comprising a plate having a rectangular opening formed in one end thereof, the upper edge of said opening having a straight bearing surface that is convex in cross section.

11. As a new article of manufacture for the purpose described, a loop comprising a plate having a rectangular opening formed in one end thereof, the upper edge of said opening having a straight bearing surface that is convex in cross section, and a bearing mounted in said opening and engaging with said bearing surface.

12. As a new article of manufacture for the purpose described, a loop comprising a plate having a rectangular opening formed in one end thereof, the upper edge of said opening having a straight bearing surface that is convex in cross section, a bearing mounted in said opening, said bearing having a flat upper surface, and a groove formed in the top of the bearing for engaging with the convex portion of the opening.

13. As a new article of manufacture for the purpose described, a loop comprising a plate having a rectangular opening formed in one end thereof, the upper edge of said opening having a straight bearing surface that is convex in cross section, a bearing mounted in said opening, said bearing having a flat upper surface, and a groove formed in the top of the bearing for engaging with the convex portion of the opening, said groove having a radius of curvature that is greater than the radius of curvature of the bearing surface of the opening.

14. As a new article of manufacture for the purpose described, a loop comprising a plate having an annular opening formed in one end thereof, the lower portion of said opening having a bearing surface that is convex in cross section.

15. As a new article of manufacture for the purpose described, a loop comprising a plate having an annular opening formed in one end thereof, the lower portion of said opening having a bearing surface that is convex in cross section, and a pin mounted in said opening and bearing against the convex portion thereof.

16. As a new article of manufacture for the purpose described, a loop comprising a plate having an annular opening formed in one end thereof, the lower portion of said opening having a bearing surface that is convex in cross section, and a pin mounted in said opening, said pin having a groove formed therein for engaging with the convex portion of the opening.

17. As a new article of manufacture for the purpose described, a loop comprising a plate having an annular opening formed in one end thereof, the lower portion of said opening having a bearing surface that is convex in cross section, and a pin mounted in said opening, said pin having a groove formed therein for engaging with the convex portion of the opening, the radius of curvature of the groove being greater than the radius of curvature of the bearing surface of the opening.

ALFRED BOUSFIELD.